United States Patent
Wong et al.

(10) Patent No.: US 6,282,627 B1
(45) Date of Patent: Aug. 28, 2001

(54) INTEGRATED PROCESSOR AND PROGRAMMABLE DATA PATH CHIP FOR RECONFIGURABLE COMPUTING

(75) Inventors: Dale Wong, San Francisco; Christopher E. Phillips, San Jose; Laurence H. Cooke, Los Gatos, all of CA (US)

(73) Assignee: Chameleon Systems, Inc., Sunnyvale, CA (US)

( * ) Notice: Subject to any disclaimer, the term of this patent is extended or adjusted under 35 U.S.C. 154(b) by 0 days.

(21) Appl. No.: 09/446,762
(22) PCT Filed: Jun. 29, 1998
(86) PCT No.: PCT/US98/13565
  § 371 Date: May 25, 2000
  § 102(e) Date: May 25, 2000
(87) PCT Pub. No.: WO99/00739
  PCT Pub. Date: Jan. 7, 1999

(51) Int. Cl.[7] .................................................. G06F 13/14
(52) U.S. Cl. ................................................ 712/15; 712/13
(58) Field of Search ................................. 712/37, 11, 13, 712/15, 20

(56) References Cited

U.S. PATENT DOCUMENTS

| | | | |
|---|---|---|---|
| 5,500,609 | 3/1996 | Kean | 326/41 |
| 5,535,342 | 7/1996 | Taylor | 395/307 |
| 5,535,406 | 7/1996 | Kolchinsky | 395/800 |
| 5,552,722 | 9/1996 | Kean | 326/41 |
| 5,583,749 | 12/1996 | Tredennick et al. | 361/790 |
| 5,603,043 | 2/1997 | Taylor et al. | 395/800 |
| 5,613,146 | 3/1997 | Gove et al. | 395/800 |
| 5,617,577 | 4/1997 | Barker et al. | 395/800 |
| 5,652,875 | 7/1997 | Taylor | 395/500 |
| 5,680,634 | 10/1997 | Estes | 395/804 |
| 5,748,979 | 5/1998 | Trimberger | 395/800.37 |
| 5,752,006 | 5/1998 | Baxter | 395/500 |
| 5,956,518 | * 9/1999 | Delton | 712/15 |
| 5,963,745 | * 10/1999 | Collins | 712/13 |
| 6,023,742 | * 2/2000 | Ebeling | 710/107 |

* cited by examiner

*Primary Examiner*—Eric Coleman
(74) *Attorney, Agent, or Firm*—Burns Doane Swecker & Mathis

(57) ABSTRACT

The present invention, generally speaking, provides a reconfigurable computing solution that offers the flexibility of software development and the performance of dedicated hardware solutions. A reconfigurable processor chip includes a standard processor, blocks of reconfigurable logic (1101, 1103), and interfaces (319*a*, 319*b*, 311) between these elements. The chip allows application code to be recompiled into a combination of software and reloadable hardware blocks using corresponding software tools. A mixture of arithmetic cells and logic cells allows for higher effective utilization of silicon than a standard interconnect. More efficient use of configuration stack memory results, since different sections of converted code require different portions of ALU functions and bus interconnect. Many types of interfaces with the embedded processor are provided, allowing for fast interface between standard processor code and configurable "hard-wired" functions.

29 Claims, 16 Drawing Sheets

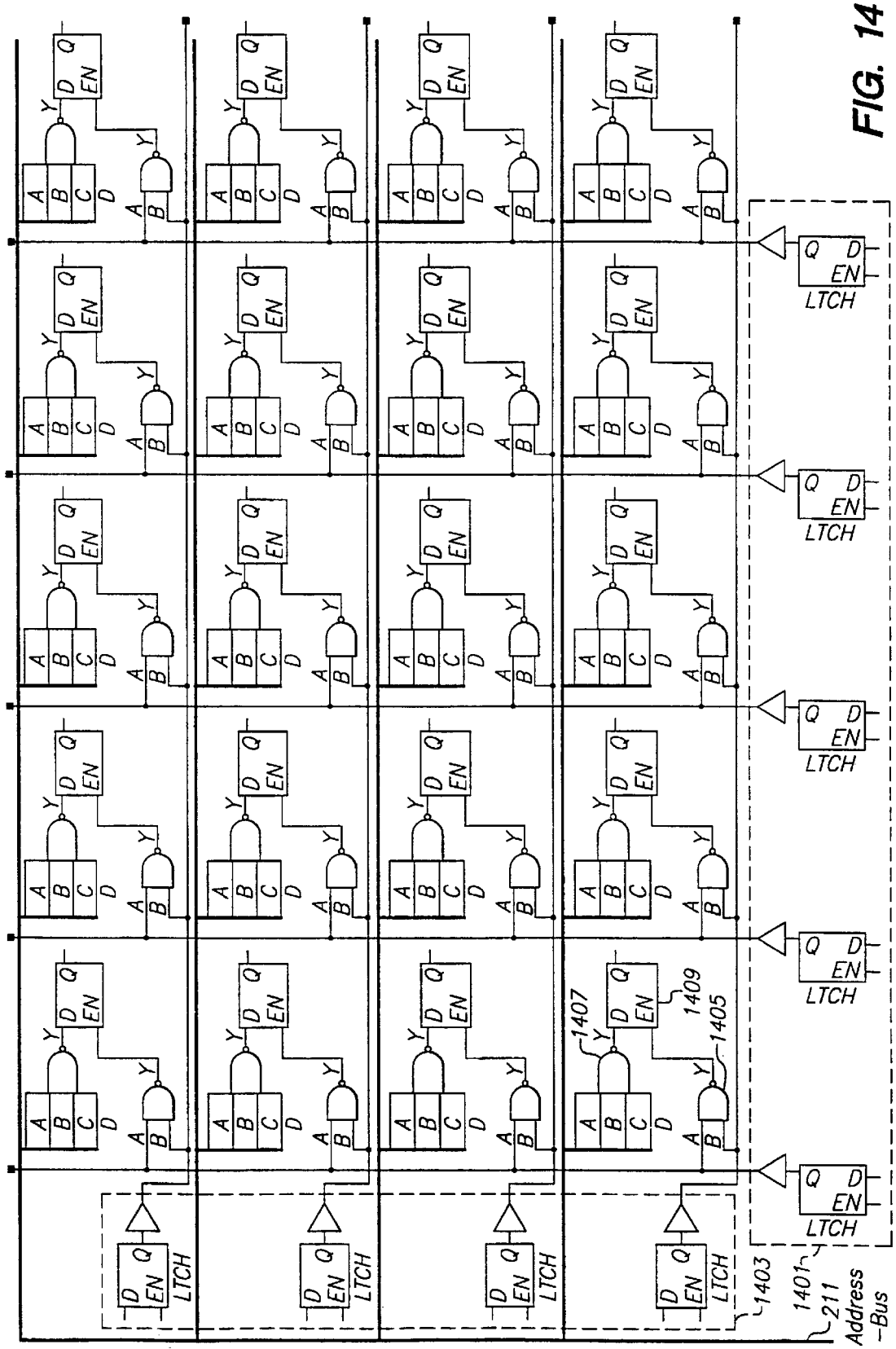

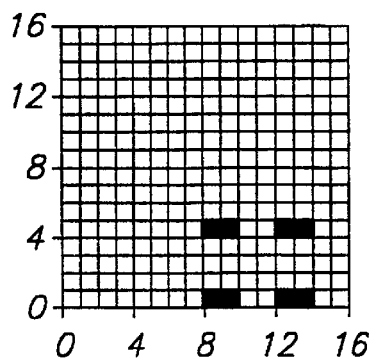
FIG. 15a
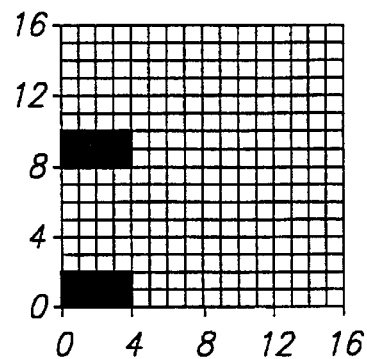
FIG. 15b
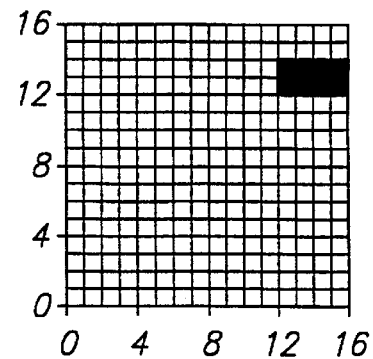
FIG. 15c
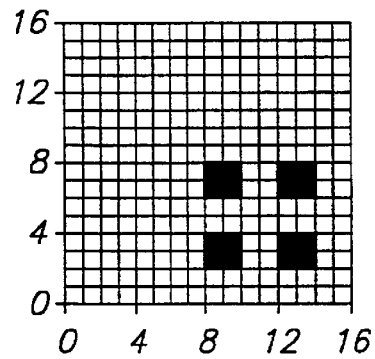
FIG. 15d
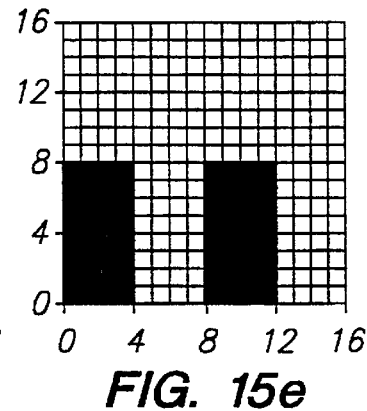
FIG. 15e
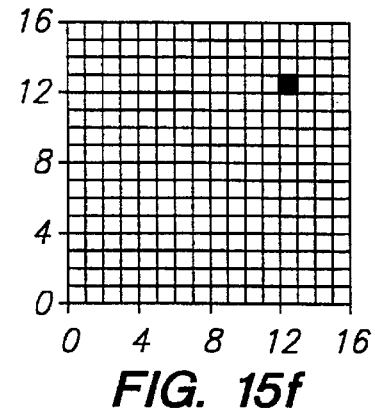
FIG. 15f
Function Map table
```
A | 110 | 1 | 2      | module
B |     |   |        | address
C |     | planes |
etc
     Run PUBs Route Fcn Swap
```
FIG. 18a
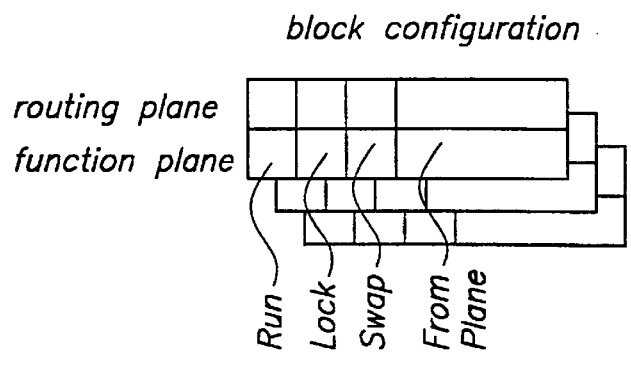
FIG. 18b

```
Get the function's address from the assembly instruction
Search the on-chip function table (Fig. 18a) for the desired address
If the address is found
    get the plane utilized from the table entry
    execute the on-chip function
If the address is not found in the on-chip table (Fig. 18a)
    find an available plane
    for each block and plane to be used do
        OR the run, lock and swap bits from the appropriate block configuration words
    end
    if run=1 then
        if lock=1 then
            increment the instruction register (skip the execute instruction)
            return
        else if swap=1 then
            invoke out the executing function
        end if
    end if
```

FIG. 19

INTEGRATED PROCESSOR AND PROGRAMMABLE DATA PATH CHIP FOR RECONFIGURABLE COMPUTING

FIELD OF THE INVENTION

The present invention relates to reconfigurable computing.

STATE OF THE ART

As the cost of increasingly complex integrated circuits continues to fall, systems companies are increasingly embedding RISC processors into non-computer systems. As a result, whereas the bulk of development work used to be in hardware design, now it is in software design. Today, whole applications, such as modems, digital video decompression, and digital telephony, can be done in software if a sufficiently high-performance processor is used. Software development offers greater flexibility and faster time-to-market, helping to offset the decrease in life cycle of today's electronic products. Unfortunately, software is much slower than hardware, and as a result requires very expensive, high-end processors to meet the computational requirements of some of these applications. Field Programmable Gate Arrays (FPGAs) are also being increasingly used because they offer greater flexibility and shorter development cycles than traditional Application Specific Integrated Circuits (ASICs), while providing most of the performance advantages of a dedicated hardware solution. For this reason, companies providing field programmable or embedded processor solutions have been growing very rapidly.

It has long been known in the software industry that typically most of the computation time of any application is spent in a small section of code. A general trend in the industry has been to build software applications, standardize the interfaces to these computationally intensive sections of code, and eventually turn them into dedicated hardware. This approach is being used by many companies to provide chips that do everything from video graphics acceleration to MPEG digital video decompression. The problem with this approach is that dedicated chips generally take one or more years to create and then are good only for their specific tasks. As a result, companies have begun providing complex digital signal processing chips, or DSPs, which can be programmed to perform some of these tasks. DSPs are more flexible than hardware but are less flexible than standard processors for purposes of writing software.

The logical extension of the foregoing trends is to create a chip which is a processor with dedicated hardware that replaces the computationally intensive sections of the application code. In fact, most complex MPEG chips already include a dedicated embedded processor, but are nevertheless not very flexible. Unfortunately, FPGAs, while they provide greater flexibility, are only 5–10% as dense as gate arrays per usable function. Since there are usually many different sections of computationally intensive code that must be executed at different times within any given application, a more efficient way of using the inherently inefficient FPGA logic is to repeatedly load each specific hardware logic function as it is needed, and then replace it with the next function. This technique is referred to as reconfigurable computing, and is being pursued by university researchers as well as FPGA companies such as Xilinx and others. U.S. Pat. No. 5,652,875 describes a "selected instruction set" computer (SISC) CPU implemented in programmable hardware. A related patent is U.S. Pat. No. 5,603,043. Both of these patents are incorporated herein by reference.

One aspect of reconfigurable computing involves configuration memory structures that allow for configuration data to be changed rapidly. An example of a single-bit portion of a conventional configuration memory structure is shown in FIG. 1. The configuration memory structure may be represented by interconnected tri-state buffers. A data bit is moved within the configuration memory structure by enabling one or more tri-state buffers. Two separate memory planes are indicated, Plane 0 and Plane 1. The contents of Plane 1 may be applied to FPGA logic by enabling buffers 101 and 103. The contents of Plane 1 and Plane 0 may be exchanged by enabling buffers 101, 105 and 107. Plane 0 and Plane 1 may also be written from an external source by enabling buffers 109 and 111, respectively. The arrangement of FIG. 6 limits the planes to serial execution and does not allow for sharing of memory planes. In particular, the FPGA contents cannot be recirculated for storage into the underlying memory planes.

Another memory arrangement is described in U.S. Pat. No. 5,246,378, incorporated herein by reference. In accordance with the teachings of this patent, data defining alternate configurations of reconfigurable logic are stored in stored in different, logically separate memories. Selection circuitry, such as multiplexers, selects between outputs of the different memories and causes the selected outputs to be applied to reconfigurable logic. Time-sliced operation is described.

Another aspect of reconfigurable computing involves "wildcarding," i.e., writing more than one word of configuration memory simultaneously as a result of a single write access, described in U.S. Pat. Nos. 5,500,609 and 5,552,772, both of which are incorporated herein by reference.

Despite the foregoing efforts, there remains a need for a low-cost, high-performance, flexible reconfigurable computing solution. The present invention addresses this need.

SUMMARY OF THE INVENTION

The present invention, generally speaking, provides a reconfigurable computing solution that offers the flexibility of software development and the performance of dedicated hardware solutions. A relatively inexpensive reconfigurable processor chip includes a standard processor, blocks of reconfigurable logic, and interfaces between these elements. The chip allows application code to be recompiled into a combination of software and reloadable hardware blocks using corresponding software tools. Various features of the reconfigurable processor chip enable it to achieve a lower-cost, higher-performance solution than pure processors. A mixture of arithmetic cells and logic cells allows for higher effective utilization of silicon than a standard FPGA. Configuration planes may be shared between ALU functions and bus interconnect. More efficient use of configuration stack memory results, since different sections of converted code require different proportions of ALU functions and bus interconnect. Many different types of interfaces with the embedded processor are provided, allowing for fast interface between standard processor code and the configurable "hard-wired" functions.

BRIEF DESCRIPTION OF THE DRAWING

The present invention may be further understood from the following description in conjunction with the appended drawing. In the drawing:

FIG. 12b is a diagram of a group of corresponding memory cells, one cell from each plane of the memory stack FIG. 12a;

FIG. 13 is a schematic diagram of an alternative embodiment for a single bit of the memory stack of FIG. 12a;

FIG. 14 is a diagram representing an addressing portion of the LSM fabric;

FIG. 15a through FIG. 15f are diagrams showing patterns of memory cells written simultaneously;

FIG. 18a is a diagram of a function map table used during loading of functions;

FIG. 18b is a diagram of block configuration words used during execution of functions; and FIG. 19 is a pseudocode listing of an exception handling routine.

DETAILED DESCRIPTION OF THE PREFERRED EMBODIMENTS

Figure 1:
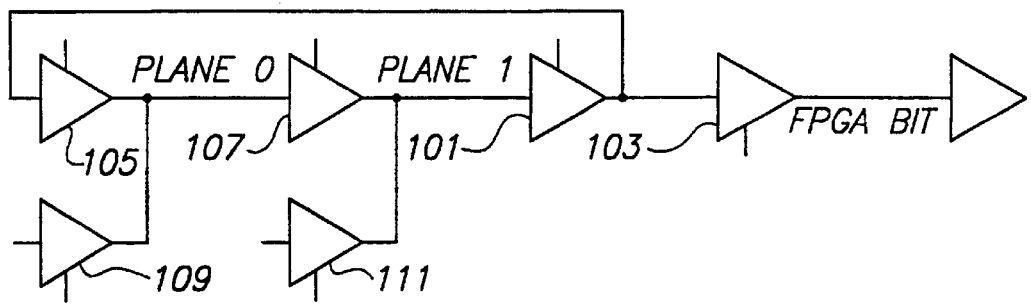
FIG. 1 is a simplified diagram of a conventional configuration memory structure.
Figure 2:
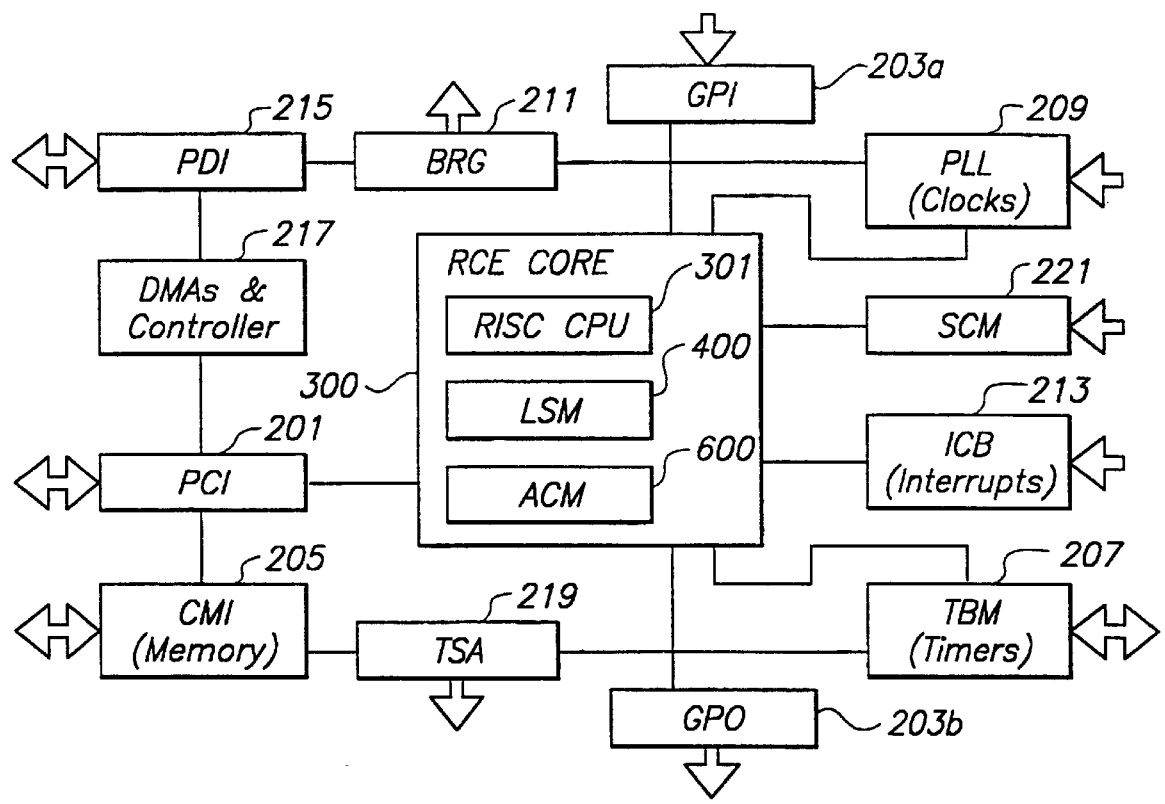
FIG. 2 is a simplified block diagram of an Adaptive Compute Engine (ACE)

Referring now to FIG. 2, a conceptual block diagram of an adaptive compute engine (ACE) in accordance with the present invention is shown. The ACE includes a reconfigurable compute engine (RCE) core 300, together with various hardwired blocks that support the RCE. In an exemplary embodiment, these hardwired blocks include the following: Peripheral Component Interface (PCI) 201; General Purpose Programmable Input/Output (GPI/O) 203a, 203b; Configurable Memory Interface (CMI) 205; Timer Bank Module (TBM) 207; Phase Lock Loop (PLL) 209; Baud Rate Generators (BRG) 211; Interrupt Control Block (ICB) 213; Peripheral Device Interface (PDI) 215; Direct Memory Access (DMA) circuitry 217; Time Slot Assign/Coherency Tags (TSA) 219; and System Control Module (SCM) 221.

Figure 3:
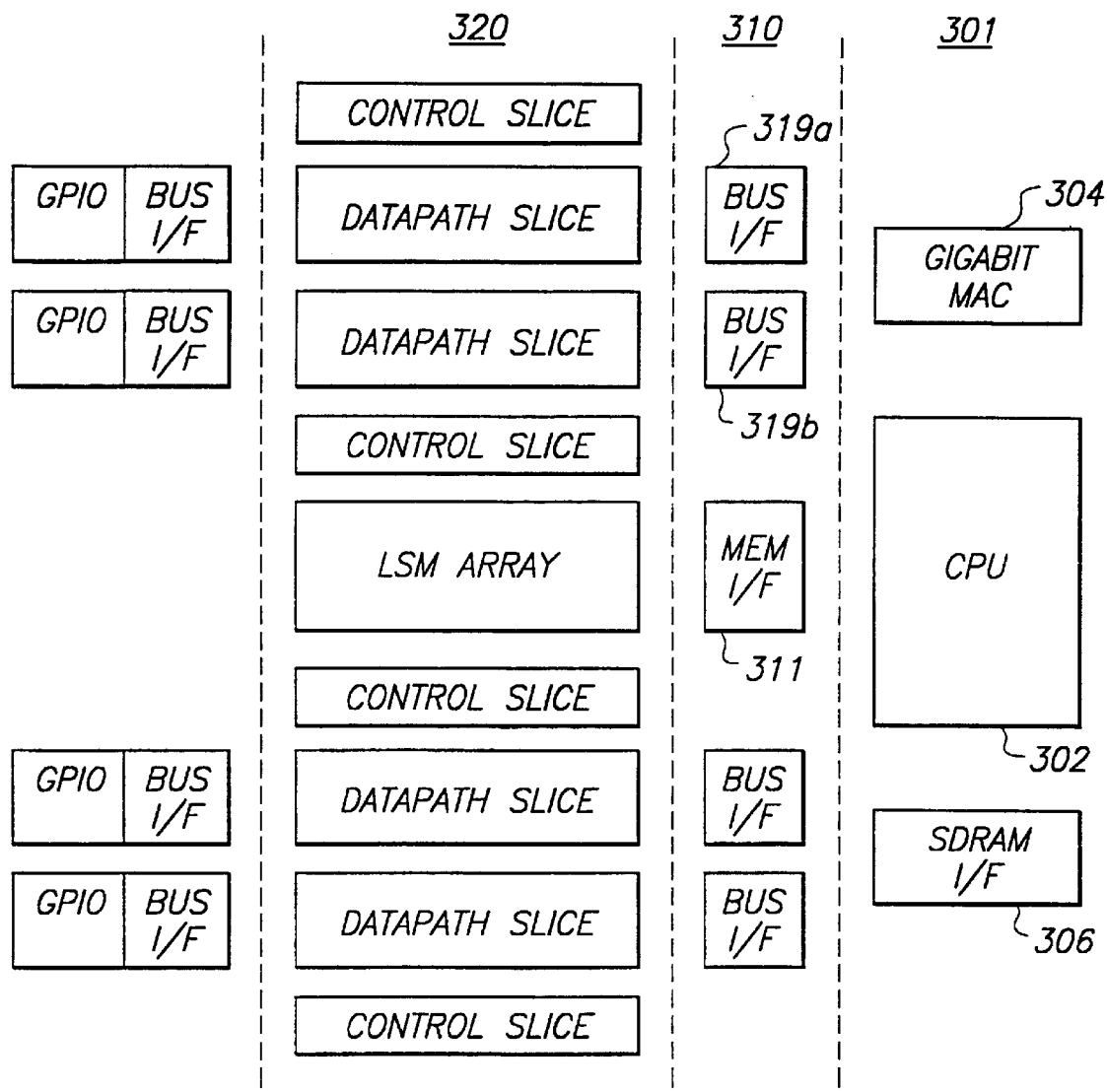
FIG. 3 is a more detailed floorplan of the Reconfigurable Compute Engine (RCE) of FIG. 2.

The RCE core 300 includes a CPU 301 (e.g, a RISC microprocessor), a local store memory (LSM) 400, and an adaptive compute module (ACM) 600. Preferably, the RCE core 300 is part of a single ACE integrated circuit. The particular topology of the integrated circuit is not critical for purposes of the present invention. However, several important aspects of such an integrated circuit in accordance with a preferred embodiment of the invention are illustrated FIG. 3, showing a floor plan of the RCE core 300 of FIG. 2. The RCE core includes a microprocessor portion 301, an interface portion 310, and an ACM portion 320. The ACM portion 320 is further subdivided into slices of reconfigurable logic. In an exemplary embodiment, the slices of reconfigurable logic include control slices 323a, 323b, . . . , and corresponding datapath slices 327a, 327b, . . . . In the example of FIG. 3, data flows in a horizontal direction and control signals run from respective control slices to respective datapath slices in the vertical direction. An LSM array (also "sliceable") 325 may be located amidst the slices as shown, or may be located beside the slices. The microprocessor 302 communicates with the slices through bus interfaces 319a, 319b, . . . , and communicates with the LSM array through a memory interface 311. Also provided are a Media Access Controller (MAC) 304 and an external memory interface 306.

Although not separately illustrated in FIG. 3, each of the slices of reconfigurable logic, as well as the local store memory (LSM), include configuration memory for that portion. In other words, configuration memory for the blocks illustrated on the left-hand side of FIG. 3 will most likely be merged together with those blocks in a "fabric," i.e., a highly regular circuit structure. Many different types of reconfigurable fabrics are well-known in the art.

Figure 4:
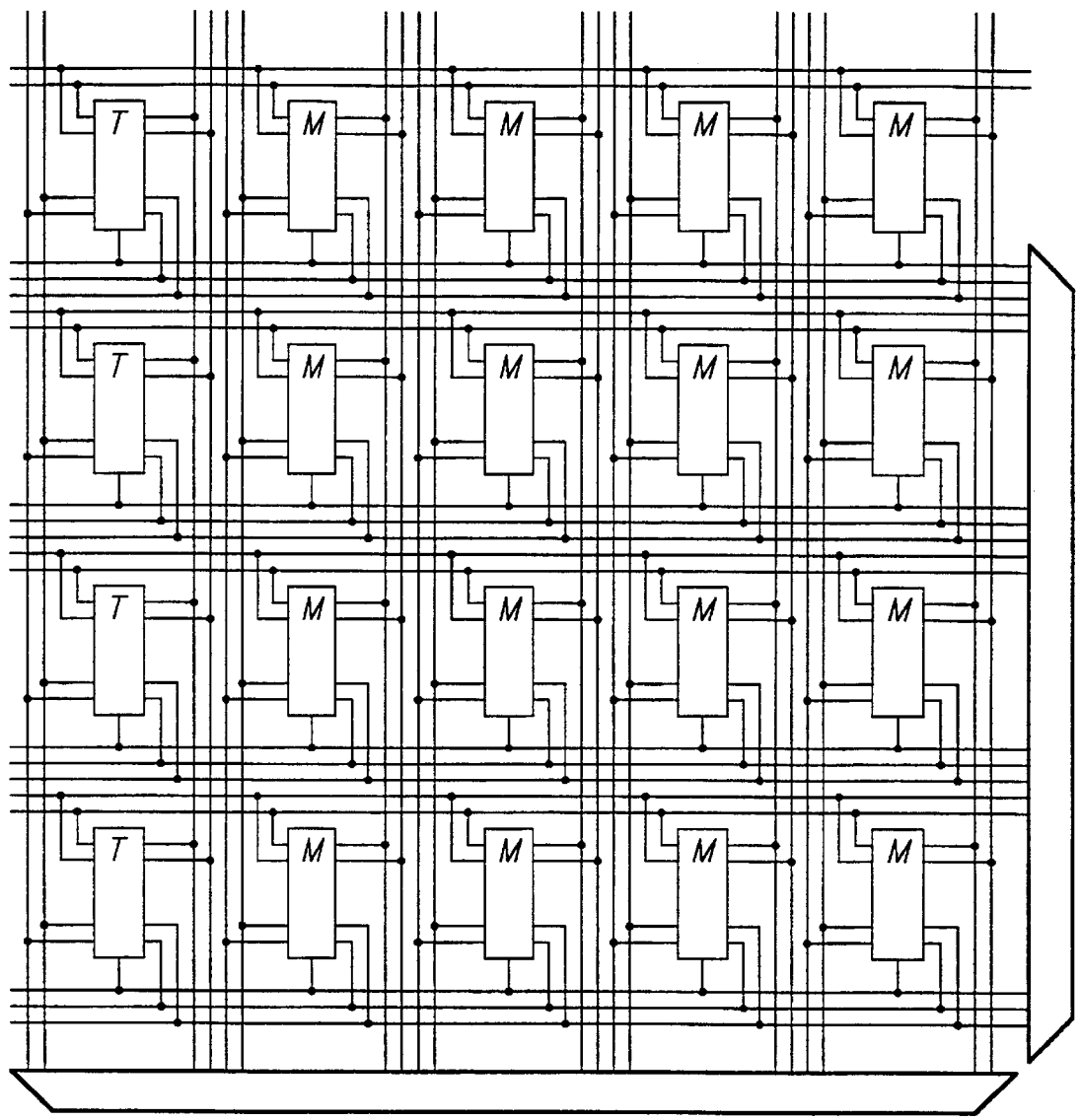
FIG. 4 is a more detailed block diagram of one possible organization of the LSM of FIG. 2.

A block diagram of one possible implementation of the LSM is shown in FIG. 4. In this embodiment, the LSM is comprised of a tiled set of storage cells. The "M" cells are nibble oriented storage structures that allow multi-port access in two dimensions. The "T" cells are optionally used bit level cells associated with the M cells for either tag bit or error bit usage. The storage blocks can be further grouped into larger structures to support larger bit widths.

In conventional ASIC implementations, arithmetic data operators are constructed sequentially, forming a row or path of operators. The resulting row of logic operators, multiplexers and registers is called a "datapath." Data travels down this path undergoing various operations and transformations.

Figure 5:
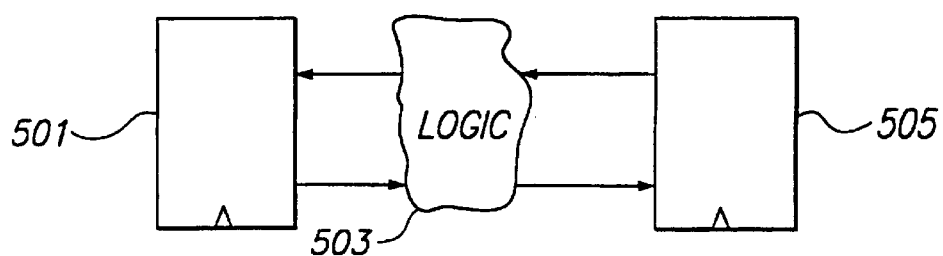
FIG. 5 is a block diagram illustrating one possible arrangement in which data is held in place and operators are reconfigured around the data.

The ACM/LSM adaptive computation fabric, on the other hand, is structured by using configuration data bits. The configuration bits are organized in multiple planes of storage. Swapping configuration planes swaps the logic in the ACM. Data can be held in place and the operators reconfigured around the data as shown, for example in FIG. 5. On a first cycle, data passes from a first register 501 through a "cloud" of reconfigurable logic 503 to a second register 505. The cloud of logic is then reconfigured, and one a subsequent cycle, the data passes back from the second register 505 through the cloud of logic 503 to the first register 501. By operating on the data on multiple passes through the cloud of logic, which may be configured differently during each pass, the equivalent of an arbitrarily long datapath may be realized in ping-pong fashion.

Multiplexing different operators onto the same logic fabric saves valuable silicon area, providing a "virtual density"

improvement. As described hereinafter, the use of multiple device configuration planes allows for virtually instantaneous reconfiguration. Furthermore, memory bandwidth requirements for loading a configuration plane are dramatically reduced using compression techniques.

Unlike existing FPGAs, the present ACM is a heterogeneous configurable fabric of control, datapath and memory partitions, including a fine-grained control structure that is used to control a coarse-grained datapath structure. The reconfigurable compute fabric may consist of a number of tiled cells that extend in the X and Y coordinate system, including DPUs (Data Path Units) and the associated ICM (InterConnection Module) components. The DPUs provide the data path functionality for the behavioral mapping and the ICMs define the bus oriented interconnection between the DPUs. Preferably, the control portion and the LSM memory fabric are defined in a similar fashion.

Figure 6:
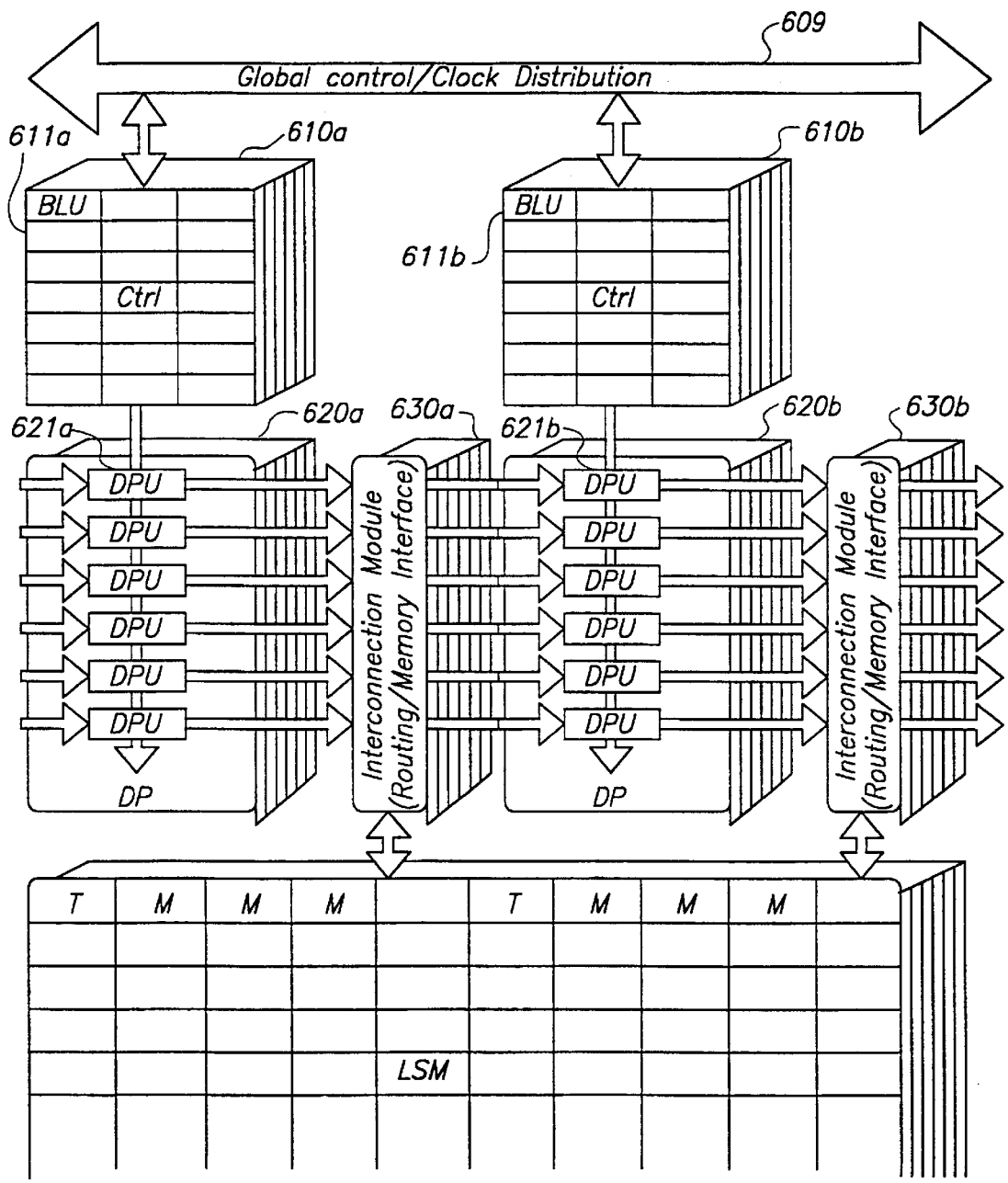
FIG. 6 is a more detailed block diagram of one possible organization of the ACM of FIG. 2 and FIG. 3.

Referring more particularly, to FIG. 6, a more detailed block diagram is shown of the ACM of FIG. 2 and FIG. 3. Corresponding reference numerals are used to indicate corresponding elements in FIG. 3 and FIG. 6. A fine-grained control structure fabric 610*a*, 610*b* consists of tiled Boolean Logic Units (BLUs) 611*a*, 611*b*. The tiled BLU array interfaces to a global signal control bus and CPU register control interface 609. The global signal bus 609 allows clock gating of registered variables or bidirectional steerage of data values. The BLUs are bit level oriented cells for orthogonal control of the ACM's datapath DPU partition slices 620*a*, 620*b*. This control can be in the form of cones of combinatorial logic or small state machines.

The datapath partition is a sliceable structure comprised of multiple bit, coarse-grained configurable datapath cells, DPUs (Datapath Program Units) 621*a*, . . . , 621*b* . . . , that efficiently support typical arithmetic and bit multiplexing operators. The DPUs operate on data in 4 bit nibbles. This allows the datapath fabric to be implemented in a denser, coarse-grained silicon implementation, compared to current FPGA technology, which uses inefficient, bit-oriented logic elements (fine-grained). The coarser-grained aggregation of data also allows construction of high performance, long bit width arithmetic function modules such as multipliers and adders. Fewer bits of control for logic configuration are required, compared to conventional bit-oriented FPGA structures. Interconnection Modules 630*a*, 630*b* are used to communicate with the LSM storage mechanism for high bandwidth data traffic for queuing or loop processing.

In FIG. 6, configuration memory planes underlying each of the various reconfigurable structures are explicitly shown. This representation is a logical representation of the ACM and not necessarily a physical representation. Physically, the structures illustrated in three dimensions in FIG. 6 may be mapped to two dimensions.

Figure 7:
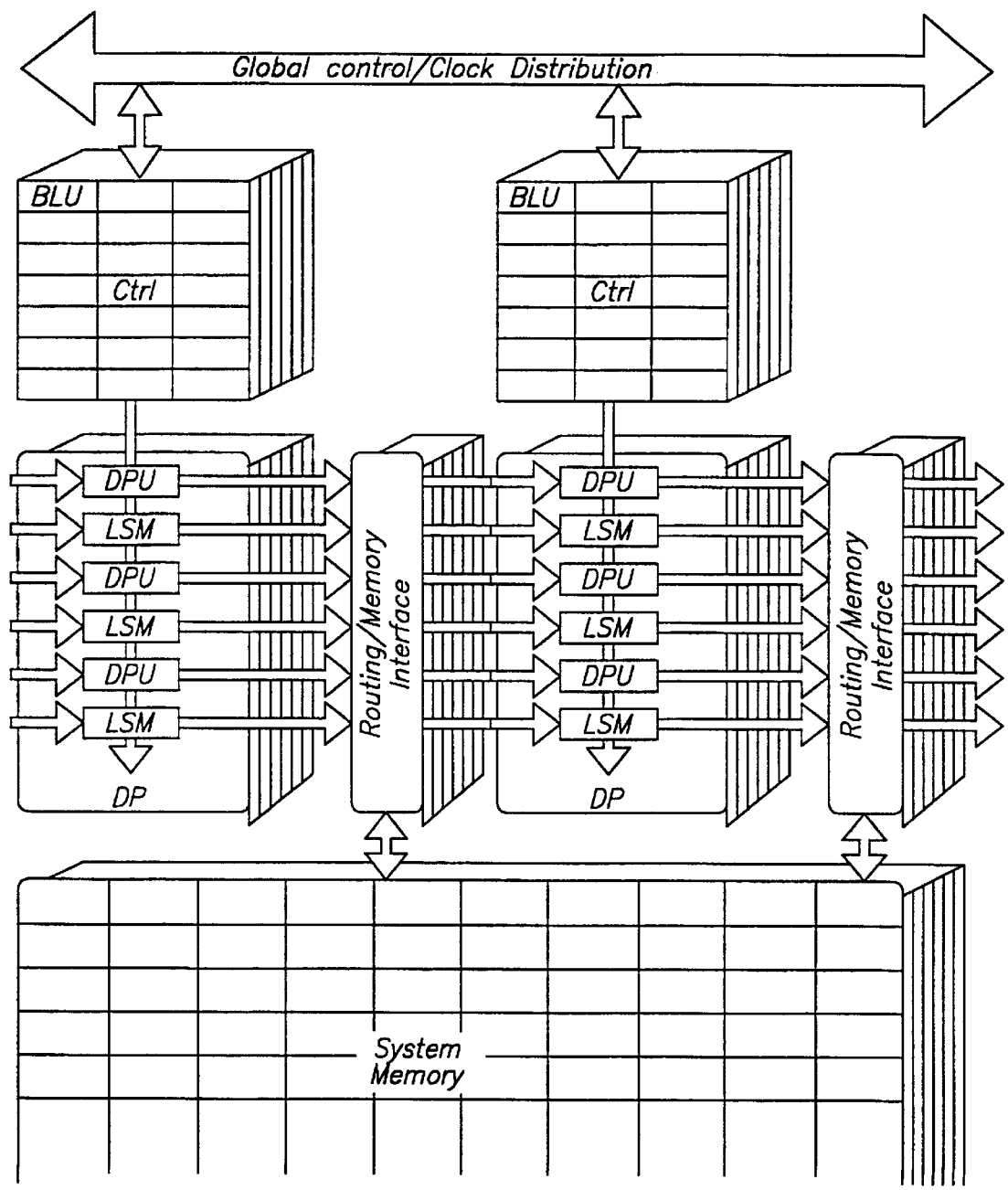
FIG. 7 is a more detailed block diagram of another possible organization of the ACM.
Figure 8:
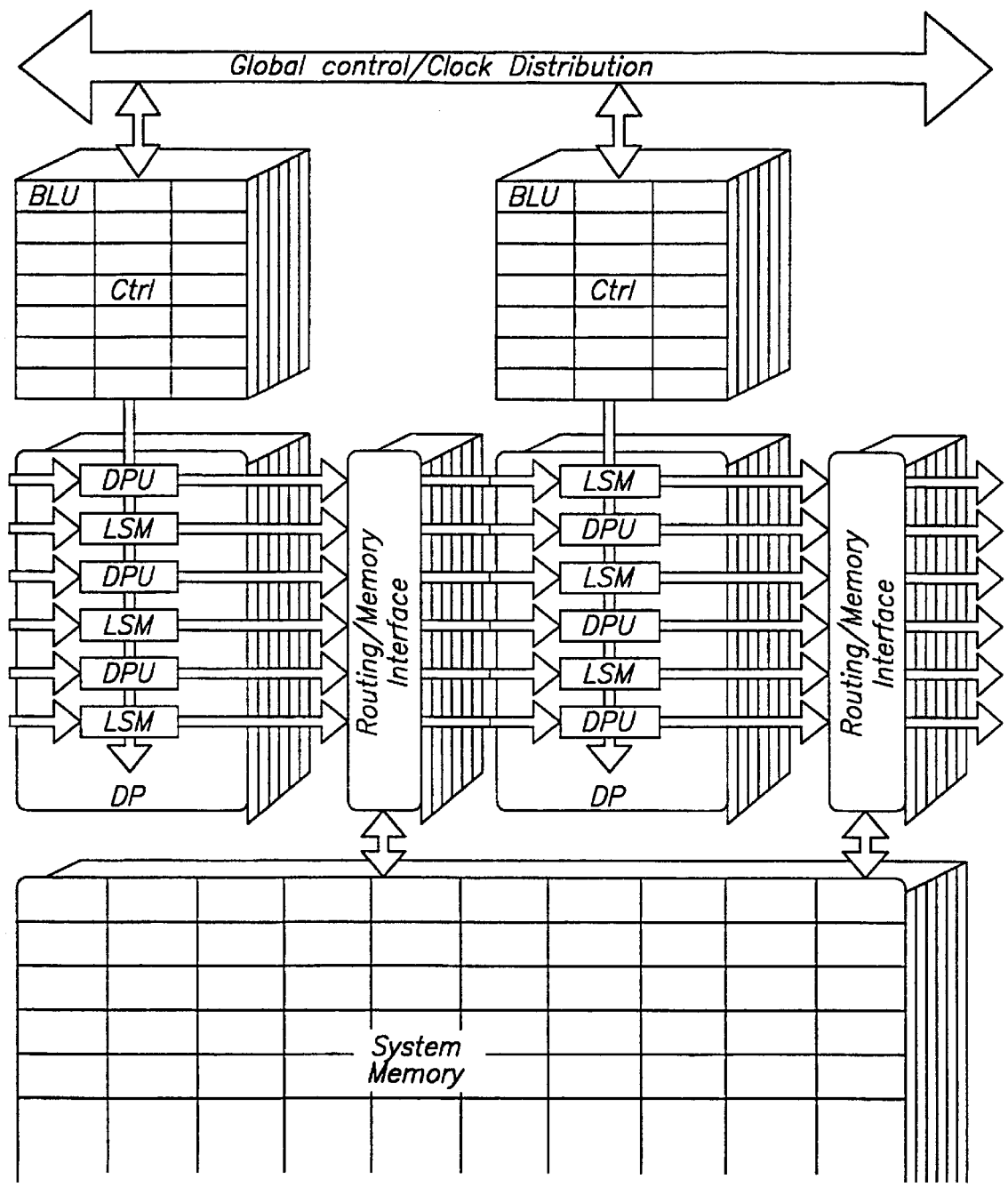
FIG. 8 is a block diagram of a further possible organization of the ACM.

Referring to FIG. 7, in an alternative implementation, the LSM is realized in distributed fashion, e.g., as 4×4 blocks of memory interspersed with the DPUs. Dispersing the LSM relieves a possible memory bottleneck. Instead of accessing the LSM through the routing/memory interface, external system memory can be accessed through the routing/memory interface. In FIG. 7, DPUs and LSM blocks alternate in the vertical direction. That is, datapath slices alternate with LSM slices. Referring to FIG. 8, DPUs and LSM blocks instead alternate in the horizontal (dataflow) direction. This layout models typical algorithm flow of operator, storage, operator, storage in a pipelined implementation.

Figure 9:
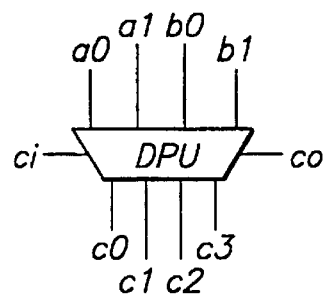
FIG. 9 is a diagram of a logic symbol for one possible realization of a Data Path Unit (DPU)

Many different types of DPUs are possible. A logic symbol for one possible DPU is shown in FIG. 9. The DPU operates as set forth in Table 1.

TABLE 1

| OP CODE | OPERATION | COMMENT |
|---|---|---|
| 0000 | NOP | Passes A and B through to the higher and lower output bits, respectively |
| 0001 | SUB | Cin must be 1 |
| 0010 | AND | |
| 0011 | MUL | May increment as well if Cin = 1 |
| 0100 | OR | |
| 0101 | INC | Cin must be 1; increments A and B together as a four-bit number |
| 0110 | XOR | |
| 0111 | ADD | |
| 1000 | SWAP | Passes B and A through to the higher and lower output bits, respectively |
| 1001 | SHIFT4 | Works on all four input bits, not just two |
| 1010 | ROT1 | Works on all four input bits, not just two |
| 1011 | SHIFT1 | Works on all four input bits, not just two |
| 1100 | ROT2 | Works on all four input bits, not just two |
| 1101 | SHIFT2 | Works on all four input bits, not just two |
| 1110 | ROT3 | |
| 1111 | SHIFT3 | |

Figure 10:
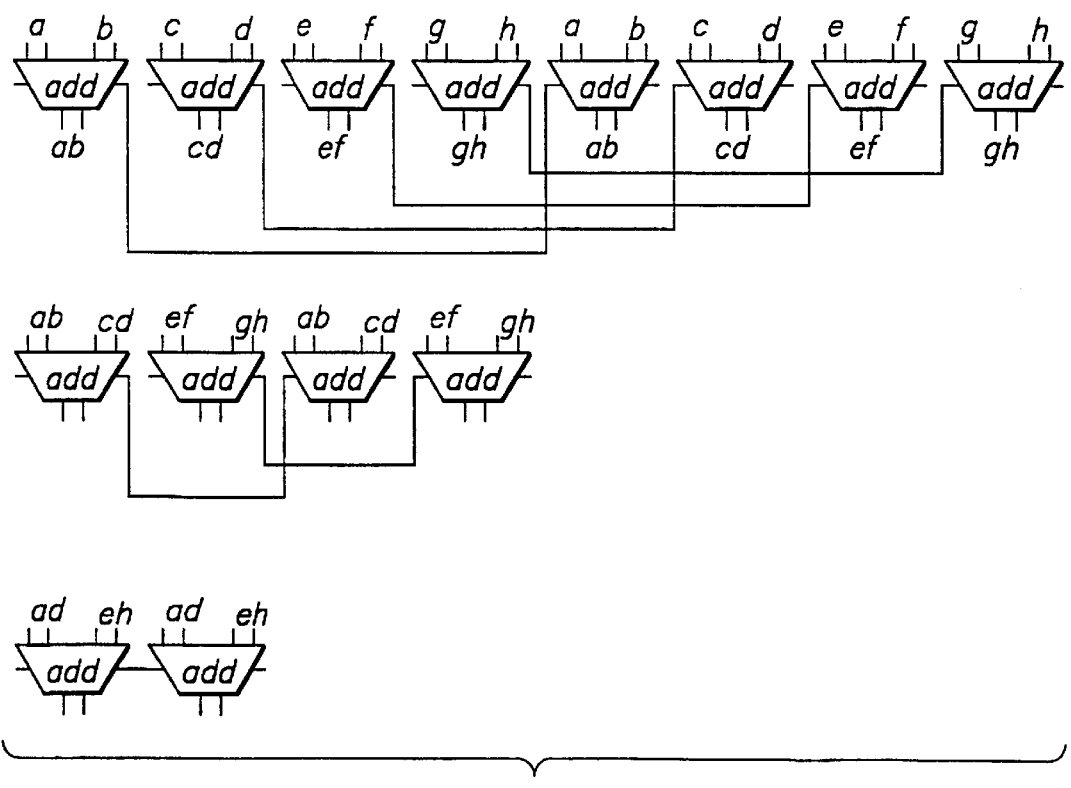
FIG. 10 is an exemplary datapath circuit realized using DPUs of the type shown in FIG. 9.

An exemplary datapath circuit realized using such DPUs is shown in FIG. 10.

An important feature of the RCE core is the ability to dynamically reconfigure the ACM on the fly in a very short amount of time--typically less than the amount of time required for a memory read operation in a conventional computer. The structure of the ACM/LSM fabric is specially adapted to enable this type of operation. More particularly, the ACM/LSM includes multiple logical memory planes, e.g., four memory planes, eight memory planes, etc. Any number of planes may be provided for (including numbers not powers of two).

Figure 11:
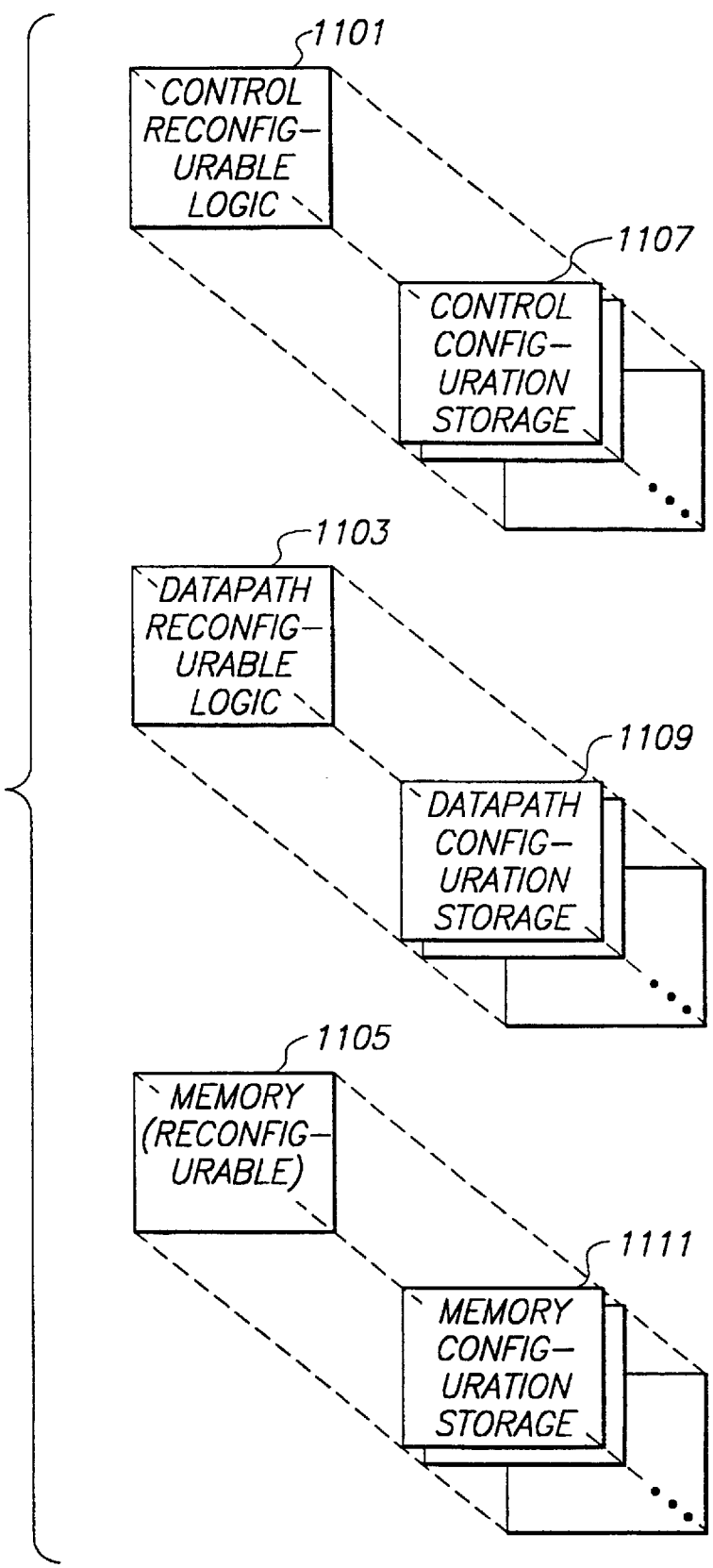
FIG. 11 is a simplified block diagram of the ACM fabric.

Referring to FIG. 11, a conceptual block diagram is shown of one block of the ACM/LSM fabric. The fabric includes control reconfigurable logic (C-RL) 1101, datapath reconfigurable logic (D-RL) 1103, and reconfigurable memory 1105. Associated with each of these structures is multiple planes of configuration storage, i.e, control configuration storage 1107, datapath configuration storage 1109 and memory configuration storage 1111.

Figure 12A:
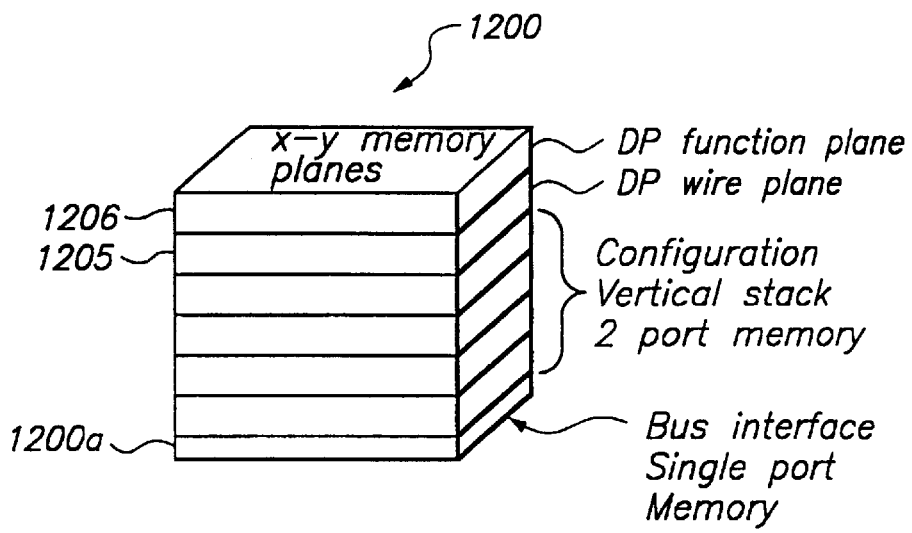
FIG. 12a is a block diagram of a portion of a multiple plane LSM corresponding to a block of the ACM.

A particular embodiment of a portion of a multiple plane corresponding to a block of the ACM/LSM fabric is shown in FIG. 12*a*. The multiple memory planes form in effect a memory plane stack 1200. In the case of a DP-RL block, the top two planes 1206, 1205 of the memory plane stack are configuration planes. Configuration data stored in these planes is applied to the reconfigurable logic. In the illustrated embodiment, "function" configuration data and "wire" configuration data is stored in different planes. The bottom memory plane 1200*a* provides external access to the memory stack. Intermediate planes function, for example, as a configuration stack, storing configurations expected to be used by not presently active. In an exemplary embodiment, memory plane 0 is single port, for single-channel read and write between system memory and configuration storage. The remaining memory planes are dual port, having one read port and one write port. Dual port supports simultaneous loading and recirculation of configuration data with the local "stack." If no data compression is used, then simultaneous real-time monitoring is possible, e.g., by writing out a "snapshot" of one or more planes of the stack.

Figure 12B:
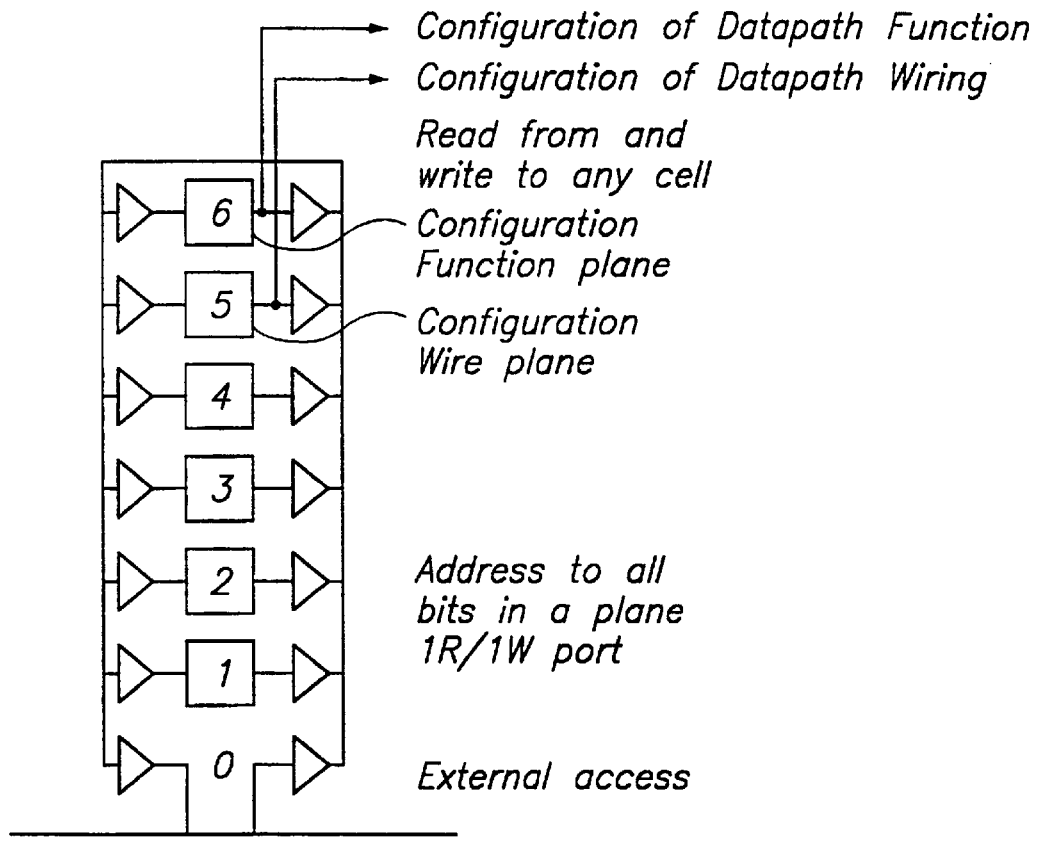

A group of corresponding memory cells, one cell from each plane of the memory stack, is shown in FIG. 12b. The ports of all of the cells are interconnected so as to allow an operation in which the contents of a cell within any plane may be read and then written to the corresponding cell of any other plane. For example, by activating the appropriate control signal, the contents of plane 4 may be read and written into plane 6. Such an operation may be accomplished, preferably, in a single clock cycle, or at most a few clock cycles. As described more fully hereinafter, configuration data is loaded from external main memory into plane 0 of the memory stack in anticipation of its being transferred into a configuration plane.

Figure 12C:
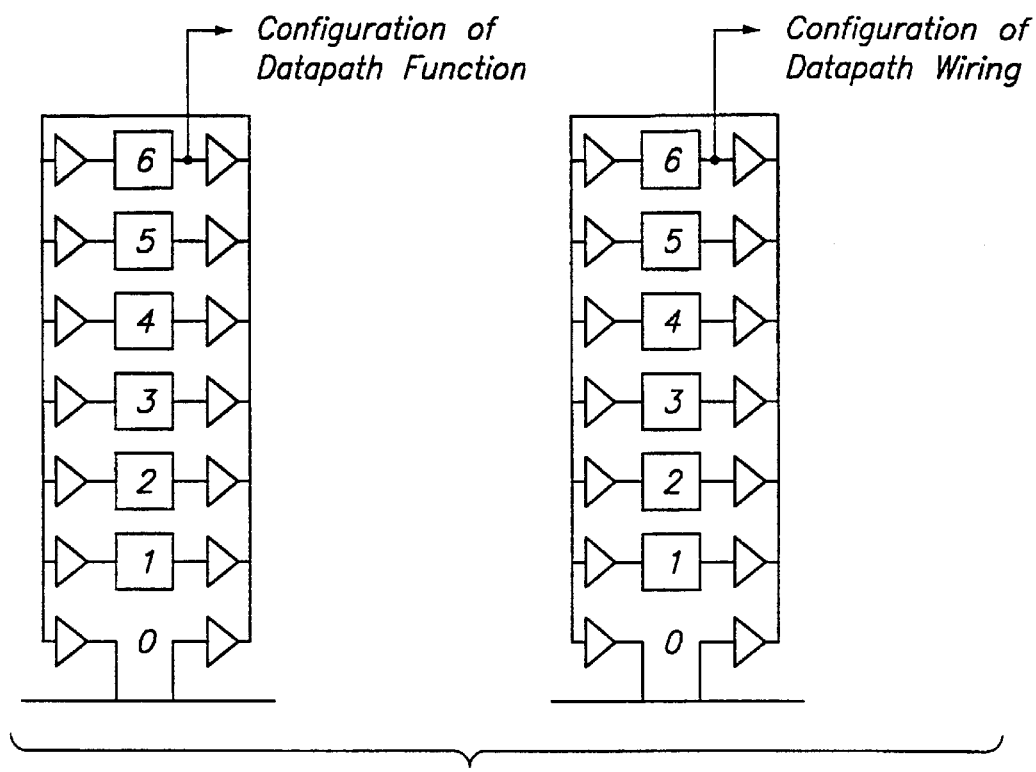
FIG. 12c is a diagram of an alternative embodiment of the memory stack of FIG. 12a in which separate "function" and "wire" stacks are provided.
Figure 12D:
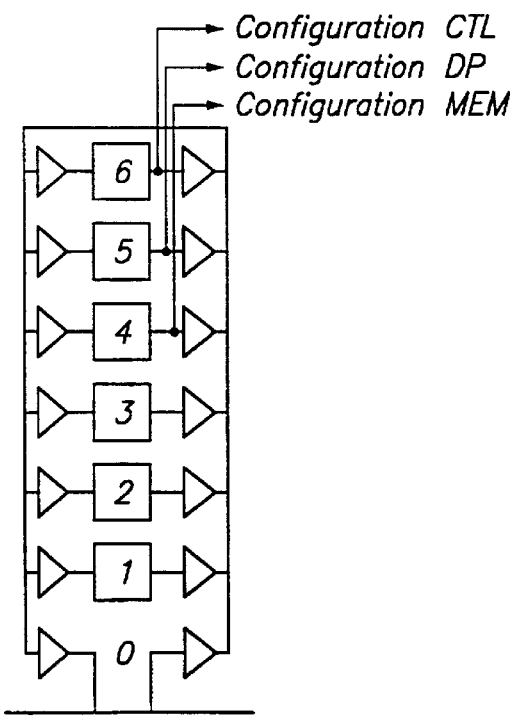
FIG. 12d is a diagram of separate memory stacks provided for control, datapath and memory configuration, respectively.
Figure 12E:
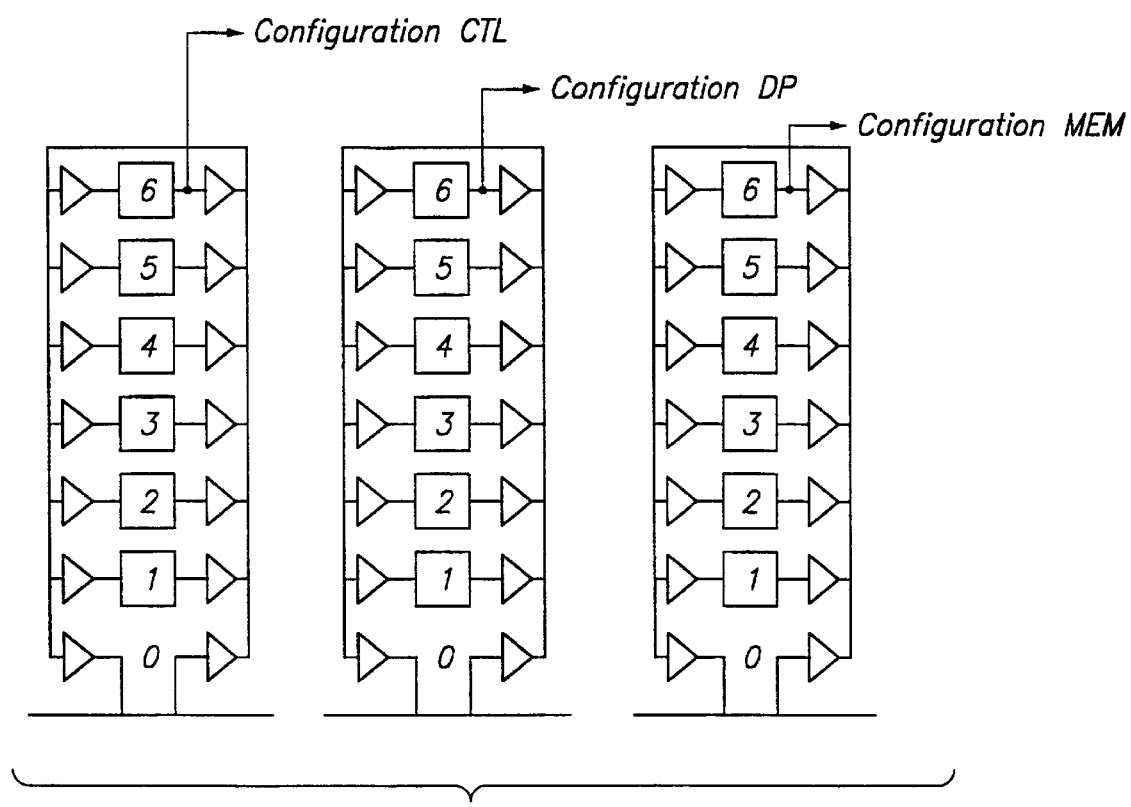
FIG. 12e is a diagram of a common memory stack provided for control, datapath and memory configuration.

Alternatively, separate "function" and "wire" stacks may be provided, as shown in FIG. 12c. Using this arrangement, function and wire configurations may be changed simultaneously. Similarly, configuration stacks for configuration of control, datapath and memory may be combined (FIG. 12d) or separate (FIG. 12e).

Figure 13:
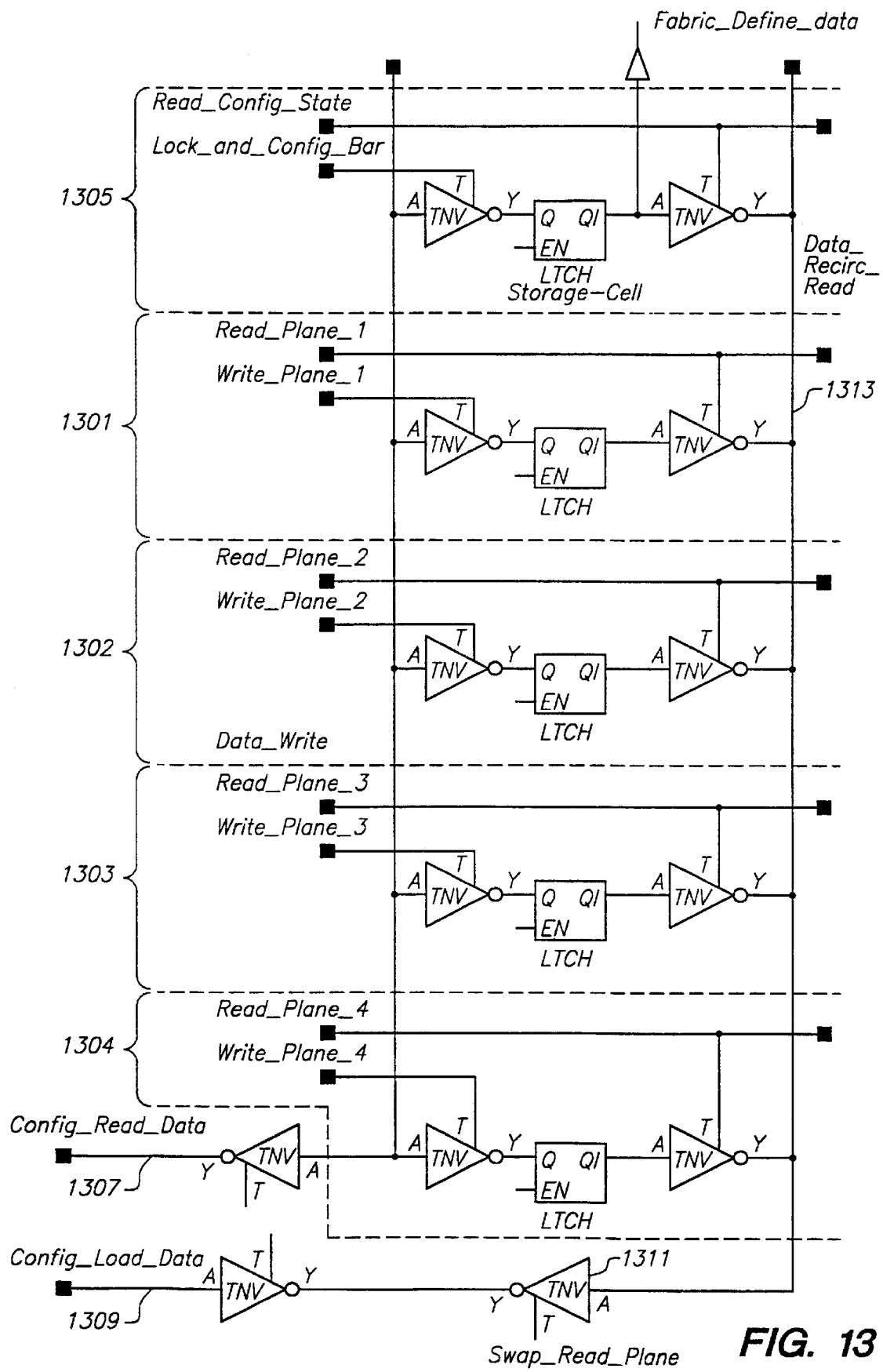

A schematic diagram of an alternative embodiment of a cell stack is shown in FIG. 13, showing a cross section of several configuration planes 1301–1304 and the lockable fabric-definition cell 1305 that produces a Fabric_Define_Data bit for a single bit location. These bits are aggregated in order to form sufficient bit numbers for functional cell type definition. For instance, a four bit grouping might designate between four to sixteen different cell type definitions. The other latch sites below the storage cell are for additional configuration plane data available for swapping as needed by functional scheduling requirements. These storage locations can be written and read to from a common configuration data bus structure. The Config_Read_Data and Config_Load_Data buses 1307 and 1309, although shown as being separate, can be combined as a single bidirectional bus for wiring efficiency. This bus structure allows configuration data to be written as needed. The Swap_Read_Plane buffer 1311 allows existing configuration plane data contents to be swapped among differing configuration planes on a selectable basis. For instance, the current operation plane of data can be loaded from configuration plane 1 to configuration plane 2 by the use of the Swap_Read_Plane buffer 1311. The structure shown in FIG. 13 is similar to a conventional SRAM memory structure which allows a dense VLSI circuitry implementation using standard memory compiler technology. This structure could also be implemented as a conventional dual port RAM structure (not shown) which would allow for concurrent operation of the write and read data operations. Unlike FIG. 12b, the example of FIG. 13 assumes separate configuration stacks for each configuration plane as described hereinafter. That is, the bit stack produces only a single Fabric_Define_Data bit instead of multiple fabric definition data bits as in FIG. 12b.

If the Data_Recirc_Read line 1313 is also connected to data storage locations that are used for normal circuit register operation, then real time monitoring of device operations can be utilized by the operating system for applications such as RMON in internetworking application area or for real time debug capability. The RMON application basically uses counter operation status from registers in order to determine system data operation flow characteristics.

FIG. 14 is a system level perspective of an access portion of the configurable ACM LSM, which provides the functionality necessary to configure an operable plane of logic. (The logic shown is at a symbolic level of representation while the actual logic to perform the cell selection and address decode can vary according to techniques commonly used for address and data for SRAM structures.) In this embodiment, a set of X and Y decode latches with associated buffers 1401, 1403 drive decode enable signals into the tiled logic plane consisting of a replicated structure composed of NAND gates 1405, 1407 and a configuration plane logic cell 1409 of the type described in relation to FIG. 14. The combination X and Y decode structure enables arbitrary collections of cell sites to be addressed by the corresponding X and Y decode enables, which are shown NANDed together to provide row/column decode capability. The address bus 1411 selects a particular configuration plane and is globally broadcast into the slice of the larger array to be programmed for either read or write of configuration data. The configuration data bus in not shown for simplicity. In the illustrated embodiment, the global address bus 1411 is decoded at each cell by the use of local cell decode logic (NAND gates 1405). Alternatively, the global address bus may be implemented in terms of straight-line, single-bit word lines.

The structure of FIG. 14 allows programming compression to be accomplished by running a compression program on the configuration map to find the commonly repeating structures so that they may be written simultaneously. This measure will significantly reduce both the size of the data file and the corresponding load time, since most of the like datapath elements will be repeating both horizontally and vertically. Configuration patterns such as those shown in FIG. 15a through FIG. 15f. The cells that correspond to a "maximal function" having highest utilization are globally selected by the X/Y decode latches for maximal coverage, and a configuration plane address is broadcast, designating a particular configuration plane layer. A global data bus (not shown) then loads a data value that corresponds to a given logic operator or wiring configuration. The next most commonly used function may then be loaded in a like process. The next configuration mapping of commonly used cell types can in fact over-write cell locations from the previous load cell type operation. That is, successive cell type load operations can supersede previous cell content loading. This method of loading allows the maximal functions to be stitched into the configuration fabric as needed in arbitrary cell locations. The ordering of cell types by usage for a given configuration plane allows the compression of information content such that individual addressing schemes for each cell location are not necessary.

The foregoing discussion has focused on the reconfigurable ACM/LSM fabric. The remainder of the discussion will focus on the interface between the fabric and the microprocessor. The microprocessor follows a standard RISC architecture and has multiple coprocessor and special instructions that may be used to interface with the reconfigurable logic. If the instructions are not used, then the configuration programming automatically adds default tie-off conditions (for cells that are not used or to safely configure routing to prevent interference of operations). In an exemplary embodiment, the microprocessor interfaces with the reconfigurable logic through some or all of the following mechanisms:

1) Via the system bus (memory mapped).
   2) Via a coprocessor bus.
   3) Via a special instruction interface (internal execution unit storage bus).
   4) Via special registers.

In case (1), the reconfigurable memory or logic planes can be accessed by writing to or reading from a defined address space via the system bus. This operation appears as if it were a regular memory access. In case (2), there exists within the RISC architecture special instructions for loading coprocessor registers and turning control over to a coprocessor. The coprocessor (in this case the ACM/LSM) signals when it is complete, and the processor can load the contents of the coprocessor interface registers back into the processor.

Figure 16:
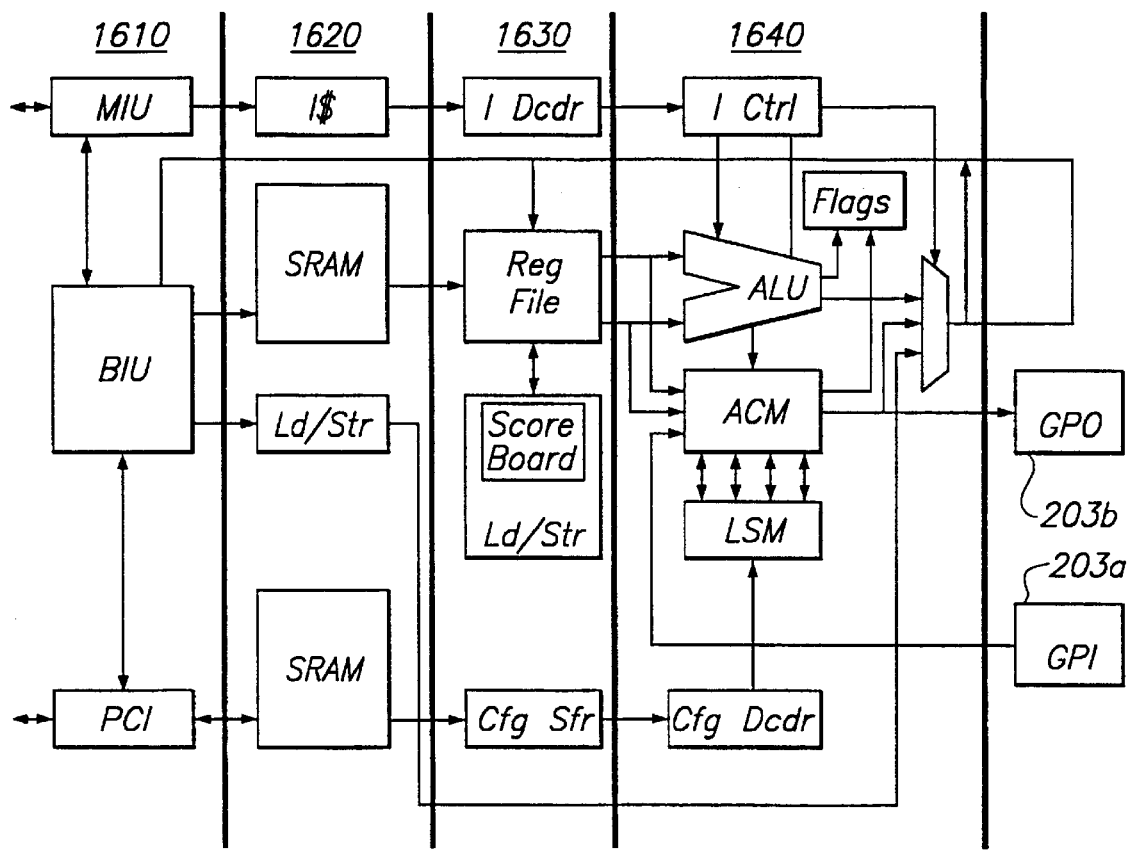
FIG. 16 is a block diagram of the ACE showing coupling of the processor core with the reconfigurable fabric.

In case (3), there exists an interface off of the internal processor bus. One possible interface is shown in FIG. 16, illustrating coupling of the processor core with the reconfigurable fabric. The processor core is realized as a four-stage pipeline including stages 1610, 1620, 1630 and 1640 (the execution stage). Within the execution stage 1640, an ALU and the ACM are tightly coupled. In particular, both the ALU and the ACM receive operational data from a register file in the stage 1630. A mapping is performed between a smaller number of registers (e.g., 32) within the register file to a potentially much larger number of registers within the ACM.

Special register-register or register-memory instructions cause two or more words to be loaded into a register at the boundary of the bus. A mechanism is provided for stalling loading of results computed in the ACM and LSM fabric into the CPU register set, if necessary, to preserve sequential program execution integrity. The stall mechanism may take the form of a flag, a dedicated signal line, etc. The results of the operation are placed within a set of special instruction registers. Any request to read the contents of a special instruction register before the stall for those registers has been cleared stalls that read instruction. Finally, in case (4), the coprocessor or special instruction registers may be read or written by either the processor or the ACM. A clock offset from the processor clock may be provided to guarantee alternating read-write cycle operation if the ACM can keep up with the processor.

In an exemplary embodiment, three specific types of special instructions are provided:

1) Load instructions which load a plane within a block.
2) Invoke instructions which transfer the contents of a plane to a configuration plane (wire or function).
3) Execute instructions, which can be in any of the four cases above.

Each of these types of instructions will be considered in turn in greater detail.

Figure 17A:
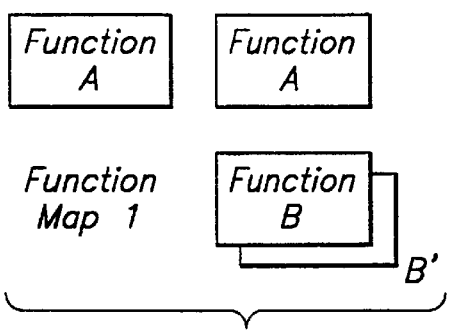
FIG. 17a is a diagram of a first exemplary configuration of ACM blocks according to various functions.
Figure 17B:
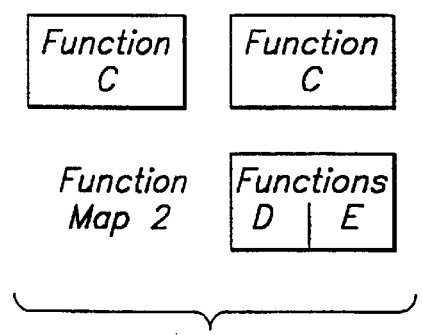
FIG. 17b is a diagram of a second exemplary configuration of ACM blocks according to various functions.

Load instructions are used to load a plane within a block. Preferably, the ability to swap planes is available both to the microprocessor and to the reconfigurable logic blocks. More than one function can be mapped onto a plane within a block, or a single functions can take up more than one block or plane. Possible configurations are shown in FIG. 17*a* and FIG. 17*b*.

Note that when a function is contained on two or more planes it is actually multiply interlinked. This is possible because the reconfigurable logic can invoke a function, and the register contents of any plane can be preserved when the routing and function configurations are changed. Preferably, a mechanism is also provided for reading and writing the register contents from the reconfigurable logic as well. This allows the swapping of the entire operation out and back, thus allowing one function to be overlayed by another without losing the first function's contents.

Development software is provided to optimally place Load and Invoke instructions within the instruction stream so as to minimize stalls within the process. Such software is described in U.S. patent application Ser. No. 08/884,377 now U.S. Pat. No. 5,966,534, incorporated herein by reference. Still, hardware must automatically trap invalid conditions in order to allow the processor to load and invoke the proper plane, and prohibit the processor from invoking a plane on top of a locked and executing process, unless the process is swappable or is expected to automatically abort is another executions is issued. These hardware functions may be performed using the function map table of FIG. 18*a* and the block configuration table of FIG. 18*b*.

Referring to FIG. 18*a*, the function map table provides the module address for the function. The module address is the address in main memory of the blocks, in compressed format, to be loaded. The function table also contains Plane Utilization Bits (PUBs), along with lock and swap bits for the function. The plane utilization bits are assigned based on execution ordering of functions that are mapped to modules in hardware for sequential program execution.

The Load function issues a soft interrupt which is handled by an on-chip "mini operating system" in a manner similar to a supervisor call. The old functions in the table are cleared for the target planes, and the planes are loaded via move instructions which use DMA transfers, in a manner similar to an interrupt driven I/O operation. While the DMA transfers are occurring, the processor returns to execute its normal instruction stream. An interrupt signalling completion of the transfer of the planes will re-enter the "driver" code which will update the function map table. If the function is already loaded, then the Load instruction returns without loading. If the module address does not exist then the operation aborts with an error exception.

The Invoke command copies the contents of one plane to another.

Referring to FIG. 18*b*, block configuration words are maintained for each block in the ACM, including, for each block, a Routing Plane word and a Function Plane word. Run, Lock and Swap bits indicate the status of the current effective configurations within each block. A "From Plane" field may be used to swap a function back to a previous plane.

The information in the block configuration words is used to determined how to handle the Execute instruction. The Execute instruction is decoded by the control logic interface to the reconfigurable logic. Either the function is resident, in which case it is executed with Run set to 1 on the appropriate planes and blocks, or it is not, in which case a soft interrupt is executed which branches the processor into an exception handling routine with the return address at the Execute command, allowing the instruction to be reissued when the function is loaded.

The exception handling routine issues one or more Invoke commands with the appropriate parameters, after determining if the current functions are locked or swappable as specified in the appropriate block configuration bits. If the block are current executing another function, Run is set to 1. If the Swap bit is 1, then functions is swappable. If the Lock bit is set to 1, then the current plane is locked. One suitable exception handling routine is described by the pseudocode of listing FIG. 19.

The effect of the exception routine is to re-execute the routine after it has been loaded or swapped in, or to skip the instruction. Note that if the currently executing function is not locked or swappable, it may be aborted.

Upon completion of the Execute instruction, when the results are returned to the processor by a mechanism such as those described above, the run bits are cleared.

The result of the foregoing approach is to allow the software to improve the run time by early loading and invoking of the functions, while always executing the functions, if at all possible, whether they have been previously loaded or not.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An integrated circuit, comprising:
   fine-grain reconfigurable control logic having bit level oriented cells;
   coarse-grain reconfigurable datapath logic having multiple bit datapath cells; and
   memory means coupled to the reconfigurable control logic and the reconfigurable datapath logic for defining multiple configurations of the reconfigurable control logic and the reconfigurable datapath logic.

2. The apparatus of claim 1, further comprising reconfigurable memory, wherein said memory means is coupled to the reconfigurable memory for defining multiple configurations of the reconfigurable memory.

3. The apparatus of claim 2, further comprising a microprocessor coupled to at least one of said reconfigurable control logic, said reconfigurable datapath logic, and said reconfigurable memory.

4. The apparatus of claim 3, wherein the microprocessor is coupled to multiple ones of said reconfigurable control logic, said reconfigurable datapath logic, and said reconfigurable memory.

5. The apparatus of any of the preceding claims, wherein said memory means comprises multiple logical memory planes.

6. The apparatus of claim 5, further comprising means for performing hardware-controlled transfer of data between logical memory planes.

7. The apparatus of claim 6, wherein said transfer of data is direct plane-to-plane transfer.

8. The apparatus of claim 7, wherein the direct plane-to-plane transfer is completed within a single cycle of the microprocessor.

9. The apparatus of claim 1, wherein said memory means comprises means for simultaneously addressing multiple memory locations located in different memory rows and different memory columns to write identical data into the multiple memory locations, whereby an amount of data needed to completely configure at least one of said reconfigurable control logic and said reconfigurable datapath logic is substantially reduced.

10. The apparatus of claim 9, wherein at least one of the reconfigurable control logic and the reconfigurable datapath logic comprises multiple cells, each cell requiring a predetermined number of bits of configuration information to configure the cell, wherein at least a portion of said memory means is organized into data words having a word length equal to the predetermined number of bits.

11. The apparatus of claim 3, further comprising a bus coupled to the microprocessor and, coupled to the bus, at least one of a bus controller for controlling an external bus and a memory controller for controlling an external memory.

12. A reconfigurable computing method using an adaptive compute engine including a microprocessor, a memory, and an array of reconfigurable logic elements having fine-grain reconfigurable control logic and coarse-grain reconfigurable datapath logic, the method comprising the steps of:
   executing instructions on the microprocessor;
   in response to one or more instructions, loading multiple sets of configuration data into the memory;
   passing data to the coarse-grain reconfigurable datapath logic; and
   passing control information to the fine-grain reconfigurable datapath logic.

13. The method of claim 12, wherein the multiple sets of configuration data comprises at least one set of effective configuration data applied to the reconfigurable logic elements and at least one set of other configuration data not applied to the reconfigurable logic elements, the method comprising the further step of, in response to a predetermined instruction, physically swapping the effective configuration data and the other configuration data.

14. The method of claim 12, comprising the further step of, in response to one or more instructions, passing data and control information between the microprocessor and the array of reconfigurable logic elements.

15. The apparatus of claim 14, comprising the further steps of, in response to one or more instructions:
   performing at least one of loading a set of configuration data from external memory to become the effective configuration data and physically swapping a set of configuration data to cause it to become the effective configuration data; and
   causing the array of reconfigurable logic element to perform data processing in accordance with the effective configuration data.

16. An integrated circuit, comprising:
   fine-grain reconfigurable control logic;
   coarse-grain reconfigurable datapath logic; and
   memory means coupled to the reconfigurable control logic and the reconfigurable datapath logic for defining multiple configurations of the reconfigurable control logic and the reconfigurable datapath logic;
   wherein said memory means comprises means for simultaneously addressing multiple memory locations located in different memory rows and different memory columns to write identical data into the multiple memory locations, whereby an amount of data needed to completely configure at least one of said reconfigurable control logic and said reconfigurable datapath logic is substantially reduced.

17. The apparatus of claim 16, further comprising reconfigurable memory, wherein said memory means is coupled to the reconfigurable memory for defining multiple configurations of the reconfigurable memory.

18. The apparatus of claim 17, further comprising s a microprocessor coupled to at least one of said reconfigurable control logic, said reconfigurable datapath logic, and said reconfigurable memory.

19. The apparatus of claim 18, wherein the microprocessor is coupled to multiple ones of said reconfigurable control logic, said reconfigurable datapath logic, and said reconfigurable datapath logic.

20. The apparatus of claim 16, wherein said memory means comprises multiple logical memory planes.

21. The apparatus of claim 20, further comprising means for performing hardware-controlled transfer of data between logical memory planes.

22. The apparatus of claim 21, wherein said transfer of data is direct plane-to-plane transfer.

23. The apparatus of claim 22 wherein the direct plane-to-plane transfer is completed within a single cycle of the microprocessor.

24. The apparatus of claim 16, wherein at least one of the reconfigurable control logic and the reconfigurable datapath logic comprises multiple cells, each cell requiring a predetermined number of bits of configuration information to configure the cell, wherein at least a portion of said memory means is organized into data words having a word length equal to the predetermined number of bits.

25. The apparatus of claim 18, further comprising a bus coupled to the microprocessor and, coupled to the bus, at least one controller for controlling an external bus and a memory controller for controlling an external memory.

26. A reconfigurable computing method using an adaptive compute engine including a microprocessor, a memory, and an array of reconfigurable logic elements, the method comprising the steps of:

executing instructions on the microprocessor;

loading multiple sets of configuration data into memory in response to one or more instructions; and simultaneously addressing multiple memory locations located in different memory rows and different memory columns to write identical data into the multiple memory locations, whereby an amount of data needed to completely configure the logic elements is substantially reduced.

27. The method of claim 26, wherein the multiple sets of configuration data comprises at least one set of effective configuration data applied to the reconfigurable logic elements and at least one set of other configuration data not applied to the reconfigurable logic elements, the method comprising the further step of, in response to a predetermined instruction, physically swapping the effective configuration data and the other configuration data.

28. The method of claim 26 comprising the further step of, in response to one or more instructions, passing data and control information between the microprocessor and the array of reconfigurable logic elements.

29. The method of claim 28, comprising the further steps of, in response to one or more instructions:

performing at least one of loading a set of configuration data from external memory to become the effective configuration data and physically swapping a set of configuration data to cause it to become the effective configuration data; and causing the array of reconfigurable logic element to perform data processing in accordance with the effective configuration data.

* * * * *